United States Patent
Nakagawa et al.

(12)

(10) Patent No.: US 6,433,995 B2
(45) Date of Patent: Aug. 13, 2002

(54) APPARATUS FOR FORMING ELECTRODE OF CHIP-LIKE ELECTRONIC PART

(75) Inventors: Tadahiro Nakagawa; Makoto Fukuda, both of Nagaokakyo (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/838,839

(22) Filed: Apr. 20, 2001

Related U.S. Application Data

(62) Division of application No. 09/122,145, filed on Jul. 24, 1998, now Pat. No. 6,270,613.

(51) Int. Cl.[7] ............................ H01G 4/06; B44C 1/165
(52) U.S. Cl. .................... 361/311; 361/310; 361/306.1; 361/306.3; 361/321; 156/235
(58) Field of Search .......................... 361/311, 306, 361/308, 310, 321, 303, 329, 306.1, 503, 517, 301.4, 309, 306.3; 156/235

(56) References Cited

U.S. PATENT DOCUMENTS

| | | | |
|---|---|---|---|
| 4,322,698 A | * 3/1982 | Takahashi et al. | 333/184 |
| 4,346,429 A | 8/1982 | DeMatos | 361/310 |
| 4,356,529 A | * 10/1982 | Kopel | 361/304 |
| 4,590,537 A | 5/1986 | Sakamoto | |
| 4,663,694 A | 5/1987 | Sakamoto | 361/305 |
| 5,032,950 A | 7/1991 | Lavene | |
| 5,371,650 A | 12/1994 | Lavene | 361/310 |
| 5,495,387 A | 2/1996 | Mandai et al. | 361/306.1 X |
| 5,547,511 A | 8/1996 | Hamuro et al. | |
| 5,632,813 A | 5/1997 | Nakagawa | |
| 5,973,390 A | * 10/1999 | Amaya et al. | 257/678 |
| 5,978,205 A | 11/1999 | Aoyagi et al. | 361/303 |
| 6,046,902 A | * 4/2000 | Nakagawa et al. | 361/306.1 |
| 6,072,687 A | 6/2000 | Naito et al. | 361/303 |
| 6,095,697 A | * 8/2000 | Lehman et al. | 385/88 |
| 6,165,866 A | * 12/2000 | Kobayashi | 438/396 |

FOREIGN PATENT DOCUMENTS

| | | |
|---|---|---|
| JP | 8-8376 | 1/1996 |
| JP | 409260182 A | * 10/1997 |

* cited by examiner

*Primary Examiner*—Dean A. Reichard
*Assistant Examiner*—Nguyen Ha
(74) *Attorney, Agent, or Firm*—Ostrolenk, Faber, Gerb & Soffen, LLP

(57) ABSTRACT

An electrode is formed on a chip-like electronic part of the type having a central axis, a polygonal cross section as viewed in a plane which is perpendicular to the central axis, a plurality of side surfaces extending in respective planes which are generally parallel to the central axis, and a pair of end surfaces extending generally parallel to the central axis, each adjacent pair of side surfaces meeting along a respective edge of the chip-like electronic part. The electrode is formed by applying a first band of conductive material to at least one of the side surfaces and applying a second band of conductive material to the remaining side surface(s) in such a manner that the first and second bands meet at respective ones of the edges and together form a continuous band of conductive material extending around the outer periphery of the chip-type electronic part. The chip-like electronic part is held by a holder with a first plurality of side surfaces being exposed and facing a paste base on which a streak of conductive material is placed. The holder and paste base are brought together so that the first band of conductive material is applied to the first plurality of side surfaces. The chip-like electronic part is then repositioned with its remaining side surfaces being exposed and facing a paste base and the second band of conductive material is applied to those side surfaces.

10 Claims, 9 Drawing Sheets

APPARATUS FOR FORMING ELECTRODE OF CHIP-LIKE ELECTRONIC PART

CROSS-REFERENCE TO RELATED APPLICATION

This is a divisional of U.S. patent application Ser. No. 09/122,145, filed Jul. 24, 1998 now U.S. Pat. No. 6,270,613 in the name of Tadahiro Nakagawa et al. and entitled "PROCESS OF FORMING ELECTRODE OF CHIP ELECTRONIC PART."

BACKGROUND OF THE INVENTION

1. Field of the Invention

The present invention relates to a process of forming an electrode for a chip-like electronic part and a holder for a chip-like electronic part, particularly to a process of forming an electrode comprising a conductive paste on an outer surface of a chip-like electronic part and a holder for a chip-like electronic part preferably used in carrying out the process.

2. Description of Related Art

FIG. 18 shows a perspective view of a chip-like electronic part 1, particularly a three terminal capacitor. End electrodes 2 and 3 are formed on respective end portions of the chip-like electronic part 1 and central electrodes 4 are formed at the central portion thereof.

Although not illustrated, first and second groups of inner electrodes are arranged alternately inside the chip-like electronic part 1 with the inner electrodes of the first group extending to the end electrodes 2 and 3 and the inner electrodes of the second group extending to the central electrodes 4. Accordingly, electrostatic capacitances formed between the inner electrodes of the first group and the inner electrodes of the second group can be taken out between the end electrode 2 or 3 and the central electrodes 4. The chip-like electronic part 1 is used to, for example, remove noise on a signal line by coupling the end electrodes 2 and 3 to the signal line and grounding the central electrodes 4.

As shown in FIG. 18, the central electrodes 4 extend across two opposing side faces of the chip-like electronic part 1. Because of limitations associated with the process commonly used to make the chip-like electronic part 1, the central electrodes 4 extend only partially on the other side faces of the chip-like electronic part. As a result, the central electrodes 4 do not extend entirely around the outer side surfaces of the chip-like electronic part 1.

The process for applying the central electrodes 4 is best understood with reference to FIG. 19. As shown herein, a groove 6 is provided in a paste base 5 which comprises an elastic body. The groove 6 is filled with a conductive paste 7 to form an elongated streak 8 of conductive paste 3. The chip-like electronic part 1 is held by a holder 9 so that one face of the chip-like electronic part 1 faces the streak 8 of conductive paste.

As best seen in FIG. 18, the chip-like electronic part 1 is an elongated parallel-piped structure having a main axis extending from end electrode 2 to end electrode 3. The central portion of the chip-like electronic part 1 is aligned with the streak 8 of conductive paste with the axis of the streak extending perpendicular to the central axis of the chip-like electronic part 1. The chip-like electronic part 1 is brought into contact with the paste base 5 and pressed against the paste base 5 to deform it and cause the conductive paste 7 to be applied to the outer surface of the chip-like electronic part 1 as shown by an imaginary line in FIG. 19.

Although the conductive paste 7 extends across the entire side face of the chip-like electronic part 1 which faces the base 5, it only extends partway up the adjacent side faces of the chip-like electronic part 1.

The orientation of the chip-like electronic part 1 is then reversed so that its opposite face extends away from the holder and towards the paste base 5 and the process is repeated to place the conductive paste 7 on the opposite face (and particularly up the adjacent side faces) of the chip-like electronic part 1. Thereafter, the so applied central electrodes 4 are cured.

Instead of placing the conductive paste 7 in a groove 6 provided in the elastic paste base 5, the conductive paste may be applied (by printing or the like) on a flat face of a paste base 5 which can be either elastic or rigid. As another alternative, a reservoir of conductive paste located on one side of a slit plate can be extruded to the other side of the slit plate via the slit in the plate by applying pressure to the conductive paste.

The end electrodes 2 and 3 are formed by dipping the ends of the chip-like electronic part 1 into a tank of conductive paste.

As mentioned above, the central electrode 4 does not normally extend around the entire outer surface of the chip-like electronic part 1. However, it is preferable that it does to reduce unnecessary inductance components where the central electrode is used as a ground electrode.

It is not impossible to form the central electrode to extend around the entire circumference of the chip-like electronic part 1 using the process shown in FIG. 19. This result can be achieved by providing a sufficient amount of conductive paste to extend at least half way up the two side faces of the chip-like electronic part 1, for example, by making the groove deeper or pressing the chip-like electronic part 1 more strongly against the paste base 5. However, as shown in the sectional view of FIG. 20, overlap portions 12 are formed on flat end faces of the chip-like electronic part. These overlap portions 12 can hamper the mountability of the chip-like electronic part. Accordingly, it is preferable that a built-up portion, such as the overlap portion 12, not be formed at the central portion of any of the side faces of the chip-like electronic part 1.

This can be avoided by using a small enough amount of conductive paste that only one side of the chip-like electronic part receives the paste during any single application. However, this will necessitate four separate applications of the conductive paste which is not efficient.

SUMMARY OF THE INVENTION

It is an object of the present invention to provide a process of forming an electrode of a chip-like electronic part and a holder for a chip-like electronic part used in the process which can resolve the above described problem.

To this end, the process of the present invention forms an electrode on a chip-like electronic part of the type having a central axis, a polygonal cross section as viewed in a plane which is perpendicular to the central axis, a plurality of side surfaces extending in respective planes which are generally parallel to the central axis, and a pair of end surfaces extending generally parallel to the central axis, each adjacent pair of side surfaces meeting along a respective edge of the chip-like electronic part, the process comprising the steps of:

applying a first band of conductive material to at least one of the side surfaces; and applying a second band of conductive material to the remaining side surface(s) in such a manner that the first and second bands meet at respective ones of the edges and together form a continuous band of conductive material extending around the outer periphery of the chip-type electronic part.

In the preferred embodiment, the first and second bands are applied to the side surfaces at an area that lies between the end surfaces, and more preferably in the middle, of the chip-like electronic part and do not extend to either end surface.

In the preferred embodiment, the chip-like electronic part has four side surfaces, the first band is applied to first and second contiguous side surfaces and the second band is applied to third and fourth contiguous side surfaces by bringing the side surfaces into contact with strips of conductive paste. The chip-like electronic part is first held in a holder with the first and second side surfaces extending outwardly from the holder and the first band is applied to the first and second side surfaces by moving a strip of conductive paste located on an elastic paste base into contact with the first and second side surfaces. Thereafter, the orientation of the chip-like electronic part is changed by either moving it within the same holder or moving it to a second holder to ensure that the third and fourth side surfaces extend outwardly from the holder. Once in this position, the second band is applied to the third and fourth side surfaces by moving a strip of conductive paste located on an elastic paste base into contact with the third and fourth side surfaces.

When desired, the first and second bands can be applied to the side surfaces at an area of the side surfaces located adjacent one of the end surfaces thereof and can simultaneously be applied to the adjacent one of the end surfaces as well as the side surfaces.

The process of the present invention can also be used to place a plurality of electrodes on a chip-like electronic part having a central axis, a polygonal cross section as viewed in a plane which is perpendicular to the central axis, a plurality of side surfaces extending in respective planes which are generally parallel to the central axis, and a pair of end surfaces extending generally parallel to the central axis, each adjacent pair of side surfaces meeting along a respective edge of the chip-like electronic part. In such a case, the process preferably comprising the steps of:

applying a set of first bands of conductive material to at least one of the side surfaces, each of the first bands being applied at a different axial position on the side surfaces so as to be spaced from one another; and applying a set of second bands of conductive material to the remaining side surface(s), each of the second bands being applied at a different axial position of the remaining side surfaces so as to be spaced from one another, each band of the first set meeting a respective band of the first set at two respective edges such that each respective pair of bands forms a continuous band of conductive material extending around the outer periphery of the chip-type electronic part. More preferably, the chip-like electronic part has four side surfaces and is in the form of a quadrangular prism.

In the preferred embodiment, three continuous bands are formed, two adjacent the end surfaces of the chip-like electronic part, the third at a position intermediate the two end surfaces of the chip-like electronic part. The bands of conductive material are applied to the side surfaces by bringing them into contact with strips of conductive paste. In the preferred embodiment, the first applying step is carried out by holding the chip-type electronic part in a holder with the first and second side surfaces extending outwardly from the holder and the first set of bands are applied to the first and second side surfaces by moving a plurality of strips of conductive paste located on an elastic paste base into contact with the first and second side surfaces. Similarly, the second applying step is carried out by holding the chip-type electronic part in a holder with the third and fourth side surfaces extending outwardly from the holder and the second set of bands is applied to the third and fourth side surfaces by moving a plurality of strips of conductive paste located on an elastic paste base into contact with the third and fourth side surfaces. The same or different holders can be used for the first and second applying steps.

According to a further aspect of the process of the present invention, an electrode is formed on each of a plurality of chip-like electronic parts of the type having a central axis, a polygonal cross section as viewed in a plane which is perpendicular to the central axis, a plurality of side surfaces extending in respective planes which are generally parallel to the central axis, and a pair of end surfaces extending generally parallel to the central axis, each adjacent pair of side surfaces meeting along a respective edge of the chip-like electronic part, and the process comprises the steps of:

simultaneously applying a first band of conductive material to at least one of the side surfaces of each of the chip-like electronic parts; and simultaneously applying a second band of conductive material to the remaining side surface(s) of each of the chip-like electronic parts in such a manner that the first and second bands of a respective chip-like electronic part meet at respective ones of the edges on that chip-like electronic part and together form a continuous band of conductive material extending around the outer periphery of that chip-type electronic part.

In the preferred embodiment, each of the chip-like electronic parts has four side surfaces and each of the first bands is applied to first and second contiguous side surfaces and wherein each of the second bands is applied to the remaining two side surfaces by bringing the side surfaces into contact with strips of conductive paste. The first applying step is carried out by holding each of the chip-type electronic parts in a single holder with the first and second side surfaces of each chip-like electronic part extending outwardly from the holder and the first band is applied to the first and second side surfaces of each of the chip-like electronic parts by moving respective strips of conductive paste located on an elastic paste base into contact with the first and second side surfaces. The second applying step is carried out by holding each of the chip-type electronic parts in a single holder with the third and fourth side surfaces extending outwardly from the holder and the second band is applied to the third and fourth side surfaces by moving strips of conductive paste located on an elastic paste base into contact with the third and fourth side surfaces. Again, a single or multiple holders can be used.

The present invention is also directed toward a combination, comprising:

a chip-like electronic part having a plurality of outer surfaces extending generally parallel to a central axis of the chip-like electronic part, at least one of the surfaces having a band of conductive material located thereon; and a holder holding the chip-like conductive part in an orientation wherein at least one of the outer surfaces of the chip-like electronic part extends outwardly from the holder and wherein the surface(s) of the chip-like electronic part which have the band of conductive material located thereon face inwardly of the holder and are not exposed.

In the preferred embodiment, the holder includes a recess in which the band of conductive material is located without the conductive material touching the walls of the recess. The holder has a groove, including a plurality of side walls, for holding the electronic part, the shape of the groove corresponding generally to the shape of the portion of the chip-like electronic part being held in the groove. The walls of the chip-like electronic part which have the band of conductive material formed thereon are preferably in contact with the side walls of the groove and the band of conductive material itself is situated in a recess formed in the groove such that the band of conductive material does not contact the walls of the groove or the walls of the recess. When the chip-like electronic part is formed in a shape of a quadrangular prism, the groove is formed in a V-like shape.

The present invention is also directed towards a chip-like electronic part comprising:

a main body portion having a central axis, a polygonal cross section as viewed in a plane which is perpendicular to the central axis, a plurality of side surfaces extending in respective planes which are generally parallel to the central axis, and a pair of end surfaces extending generally parallel to the central axis, each adjacent pair of side surfaces meeting along a respective edge of the main body portion;

a pair of end electrodes located on the end surfaces of the main body portion; and a central electrode comprising a sintered metal formed of an electrode paste and extending over each of the side surfaces of the main body portion so as to extend entirely around the outer periphery of the main body portion, the central electrode being formed of two bands of sintered conductive paste, the two bands meeting at respective edges of the main body portion.

The two respective edges are preferably located 180 degrees apart from one another as measured around the central axis of the main body portion with the two bands overlapping one another at the respective edges.

BRIEF DESCRIPTION OF THE DRAWINGS

For the purpose of illustrating the invention, there is shown in the drawing a form which is presently preferred, it being understood, however, that the invention is not limited to the precise arrangement and instrumentality shown.

DETAILED DESCRIPTION OF THE PREFERRED EMBODIMENTS

Figure 1:
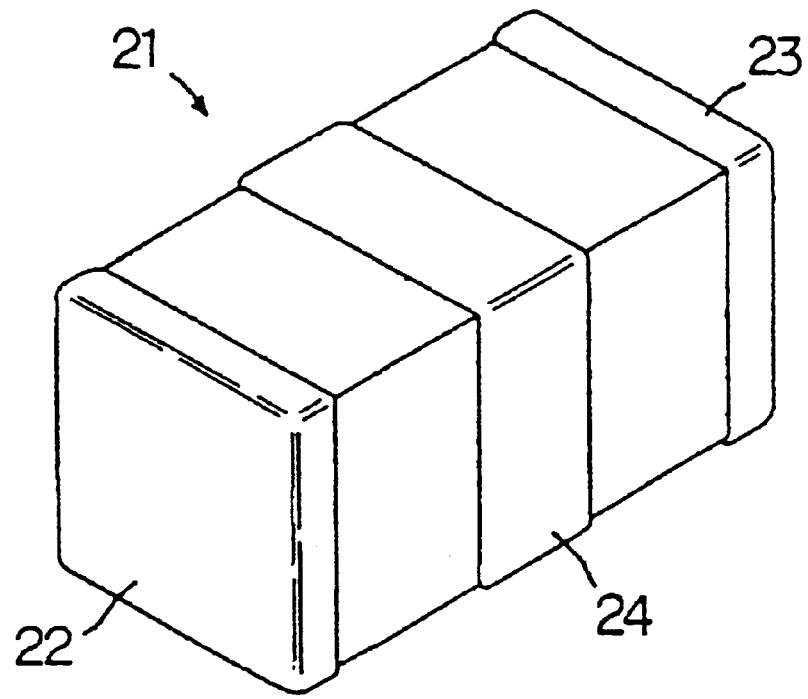
FIG. 1 is a perspective view of a chip-like electronic part 21 to which a process of forming an electrode according to one embodiment of the present invention is applied.

Referring now to the drawings wherein like numerals indicate like elements, there is shown in FIG. 1 a chip-like electronic part 21 on which a central electrode has been formed using a process corresponding to a first embodiment of the present invention. The chip-like electronic part 21 is a quadrangular prism having a section which is substantially square in shape. End electrodes 22 and 23 are respectively formed on opposite end surfaces of the chip-like electronic part 21 and a central electrode 24 is formed at the central portion thereof (as measured along the central axis of the part 21). The central electrode 24 is formed to extend around the entire periphery of the outer surface of the chip-like electronic part 21.

Figure 2:
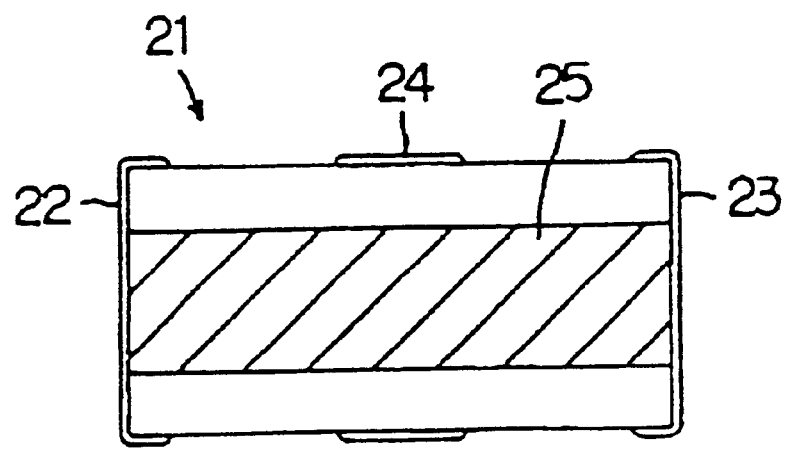
FIG. 2 is a sectional view showing an inner electrode 25 of the chip-like electronic part 21 of FIG. 1.
Figure 3:
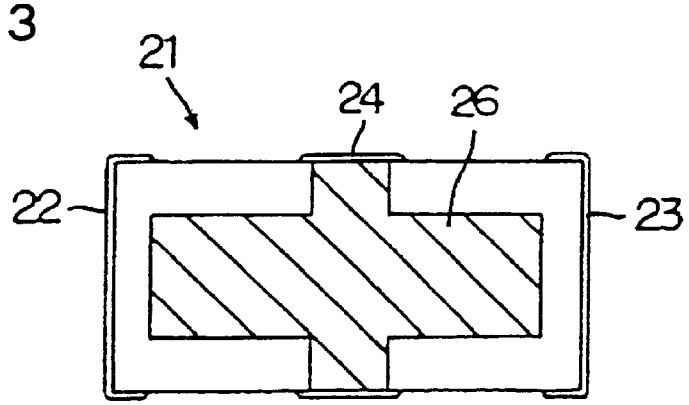
FIG. 3 is a sectional view showing an inner electrode 26 of the chip-like electronic part 21 of FIG. 1.

The chip-like electronic part 21 constitutes a three terminal capacitor having at least one, and preferably a plurality, of inner electrodes 25 defining a first group of inner electrodes (one of which is shown in FIG. 2) and at least one, and preferably a plurality, of inner electrodes 26 defining, a second group of inner electrodes (one of which is shown in FIG. 3). Individual electrodes of the first and second groups are arranged alternately to one another so as to be interleaved. As shown in FIG. 2, the inner electrodes 25 of the first group are coupled to the end electrodes 22 and 23. As shown in FIG. 3, the inner electrodes 26 of the second group are coupled to the central electrode 24. The electrostatic capacitances formed between the inner electrodes 25 of the first group and the inner electrodes 26 of the second group can be taken out between the end electrode 22 or 23 and the central electrode 24. The chip-like electronic part 21 can be used, for example, to remove noise on a signal line by interposing the end electrodes 22 and 23 in the signal line and grounding the central electrode 24.

Figure 4:
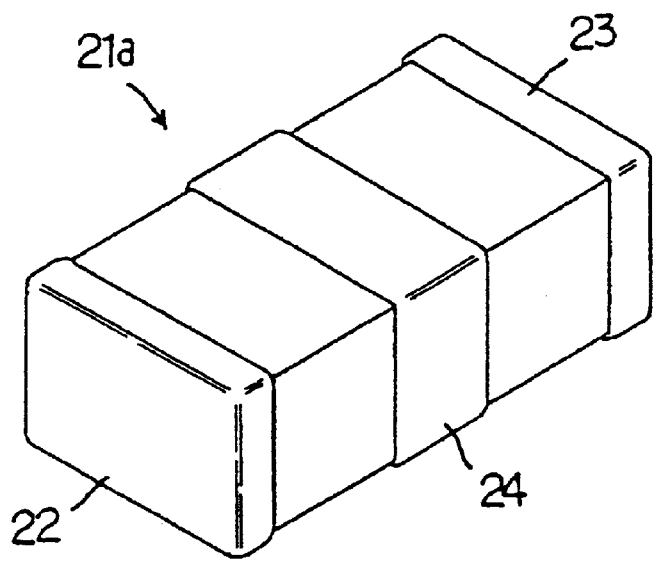
FIG. 4 is a perspective view of a chip-like electronic part 21a to which a process of forming an electrode according to other embodiment of the present invention is applied.

The process of the present invention can also be used to apply the central electrode to the chip-like electronic part 21a of FIG. 4. Chip-like electronic part 21a is substantially similar to chip-like electronic part 21 of FIG. 1 except that it has a rectangular cross section. Since the structure is otherwise the same, no further description is provided.

An explanation will be provided of a process of forming the central electrode 24 of the chip-like electronic part 21 shown by FIG. 1 with reference to FIG. 5 through FIG. 13. Because the end electrodes 22 and 23 are normally formed after the central electrode 24 is formed in FIG. 5 through FIG. 9 and FIG. 11 through FIG. 13, the end electrodes 22 and 23 of the chip-like electronic part 21 are not illustrated. However, this is not necessarily the case and the central electrode 24 may be applied after the end electrodes 22 and 23 have already been formed.

Figure 5:
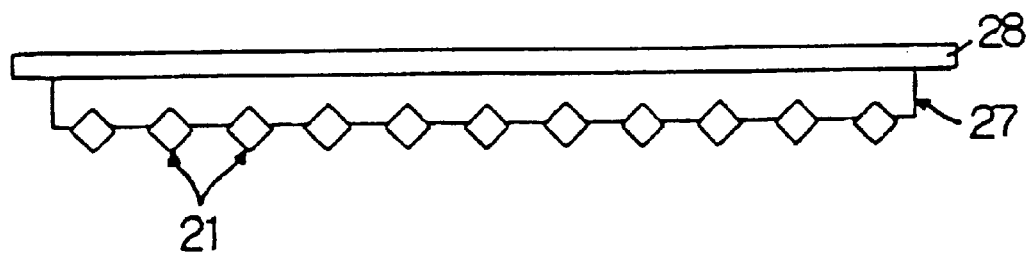
FIG. 5 is a front view showing a plurality of chip-like electronic parts 21 of FIG. 1 held by a holder 27.
Figure 6:
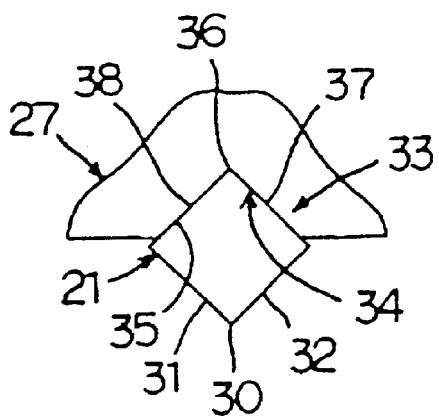
FIG. 6 is a partial, enlarged front view showing a single chip-like electronic part 21 held by the holder 27 of FIG. 5.

Referring to FIG. 5, a holder 27 adapted to hold a plurality of the chip-like electronic parts is attached to a rigid base. An enlarged view of a portion of the holder 27 is shown in FIG. 6.

The holder has a plurality of holding portions 33 for holding a plurality of the chip-like electronic parts 21. Each chip-like electronic part 21 has at least two outer surfaces facing outward so that a portion of the central electrode can be applied thereto. More generally, a portion of the outer surface corresponding to an arc of at least 180° around the center axis of the part 21 is exposed. In the example shown, two side faces 31 and 32, located on opposite sides of edge line 30, are exposed. Each of the holding portions 33 is preferably provided with a holding groove 34 for receiving the non-exposed surfaces of the chip-like electronic part 21. The holding groove 34 has a contact face 35 against which the non-exposed surfaces 37 and 38 of the chip-like electronic part 21 rest. Since the chip-like electronic part 21 has a square cross-section the contact face 35 has a V-like shape.

The holder 27 is formed, for example, from an elastic body. The contact face 35 adheres to the chip-like electronic part 21 to hold it in place. This can be achieved by any suitable means such as by vacuum sucking.

Figure 7:
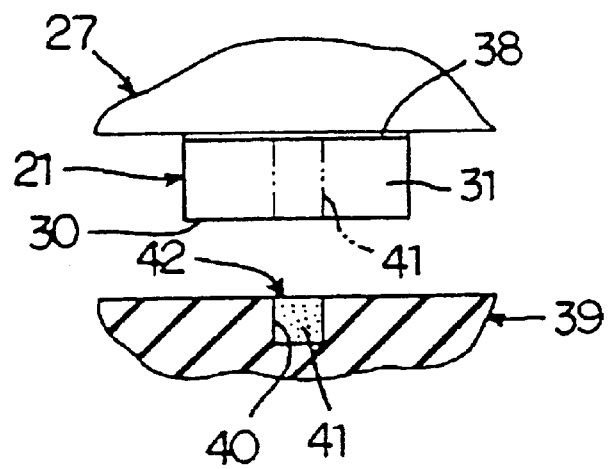
FIG. 7 is a side view showing a single chip-like electronic part being held by the holder 27 of FIG. 5 and also showing a section of paste base 39.

Next, as shown in FIG. 7, a groove 40 located in an elastic paste base 39 is filled with a conductive paste 41 to form a paste streak 42 (paste extending in a shape of a streak). The chip-like electronic part 21 is held by the holder 27 in an orientation wherein the paste streak 42 extends orthogonal to the central axis of the chip-like electronic part 21 and is positioned at a location corresponding to the middle of the chip-like electronic part 21. The holder 27 and the paste base 39 are brought into contact with one another so that the paste base 39 is deformed and presses against the outer side surfaces 31, 32 of the chip-like electronic part 21 and conductive paste 41 from the paste streak 42 is applied to the side surfaces 31, 32 as shown in phantom in FIG. 7.

Figure 13:
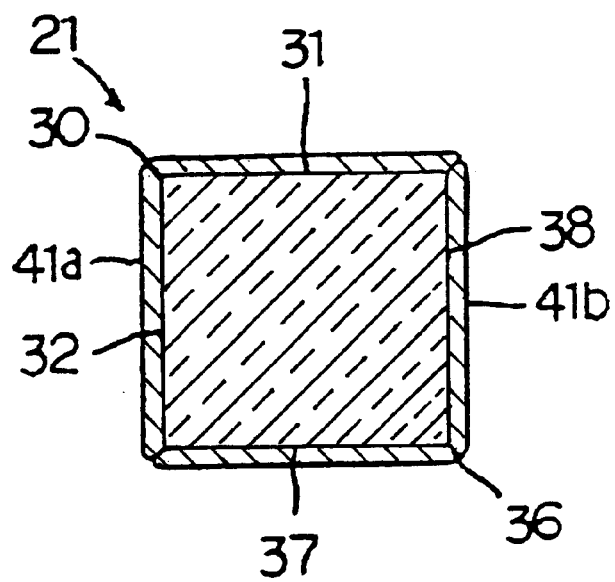
FIG. 13 is a sectional view schematically showing the chip-like electronic part 21 provided with conductive pastes 41a and 41b for the central electrode 4 of FIG. 1.

In accordance with this step of the process, a band of conductive paste 41 is provided on the contiguous side faces 31 and 32 but is not applied to the opposite side faces 37 and 28. Similarly, the conductive paste does not stain the holder 27. The resultant band of conductive paste 41 is shown in FIG. 13 as band 41a.

Figure 8:
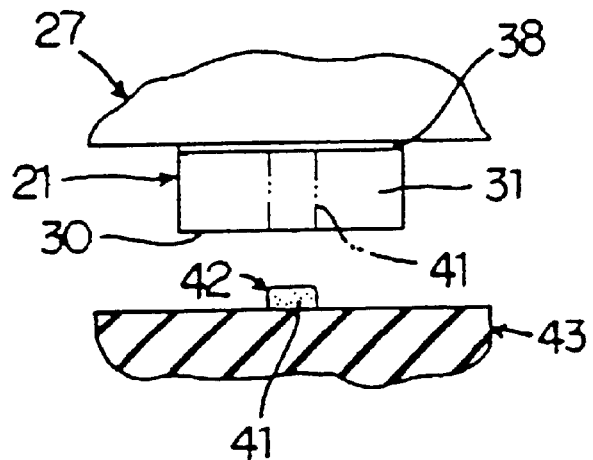
FIG. 8 is a view corresponding to FIG. 7 but in which a paste base 43 is used in place of the paste base 39 of FIG. 7.
Figure 9:
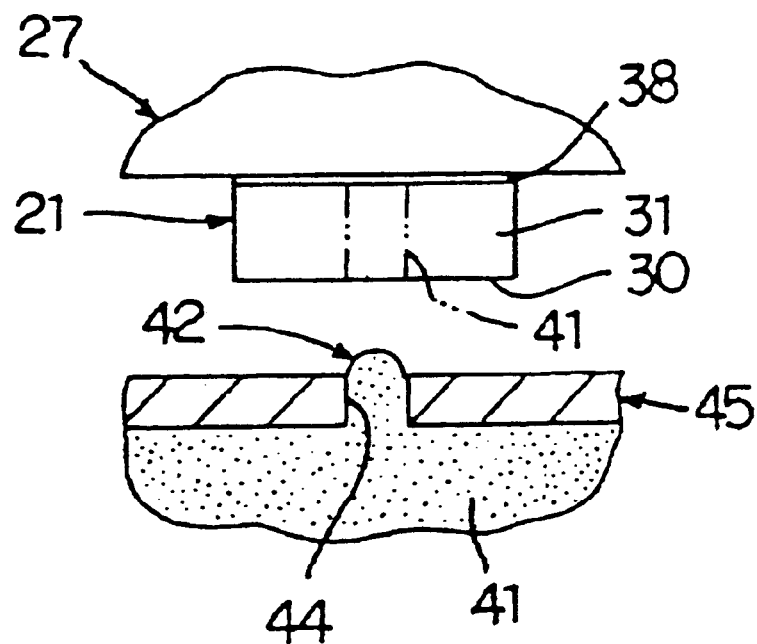
FIG. 9 is a view corresponding to FIG. 7 in which a slit plate 45 is used in place of the paste base 39 of FIG. 7.

Two non-limiting alternative process of forming the conductive paste streak 42 are shown in FIGS. 8 and 9.

In the embodiment of FIG. 8, the conductive paste 41 is applied to the flat face of the paste base 43 which may be an elastic or rigid body. If it is a rigid body, it may be necessary to rotate the part 21 back and forth about its longitudinal axis to bring the two opposite side faces 31 and 32 into contact with the paste streak 42. The conductive paste 41 may be built up onto the surface of the paste base 43 by printing or the like to form a conductive paste streak 42.

In the embodiment of FIG. 9, a supply of conductive paste 41 is arranged on one side of a plate 45 having an elongated slit 44 (which may be rigid or deformable) and is extruded through the slit 44 to form a conductive paste streak 42.

The paste base 39 of FIG. 7 and the paste base 43 of FIG. 8 are preferably deformed more easily than the elastic body constituting the holder 27 to avoid undesirable deformation of the holder 27.

Figure 12:
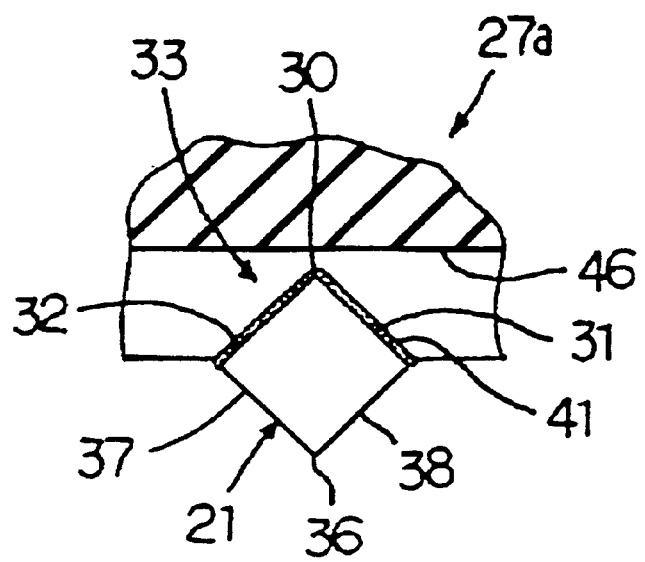
FIG. 12 is a sectional view taken along a line XII—XII of FIG. 11.

Once the conductive paste 41 has been applied to the faces 31, 32 of the chip-like electronic part 21, the part 21 is either transferred to a second holder or removed from the first holder, rotated, and returned thereto, for application of conductive paste to the remaining two side faces 37 and 38. The second holder may have a structure similar or identical to that of the holder 27. In any event, the chip-like electronic part 21 is held by the holder so that the coated side surfaces 31, 32 face inwardly (are not exposed) and the remaining faces 37, 38 face outwardly as shown in FIG. 12. In the preferred embodiment, two substantially similar holders are used and the transfer takes place by positioning the two holders opposite one another and simultaneously transferring the plurality of the chip-like electronic parts 21 from the first holder to the second holder in a single motion.

Figure 10:
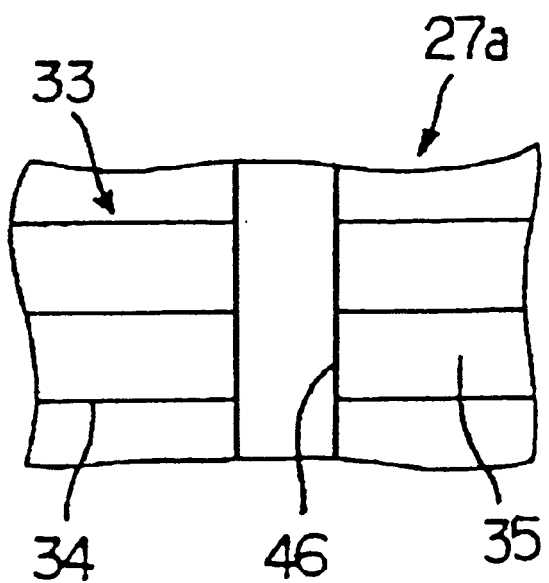
FIG. 10 a bottom view showing a portion of a holder 27a which is preferably used in a step of providing a conductive paste 41 at a second time.
Figure 11:
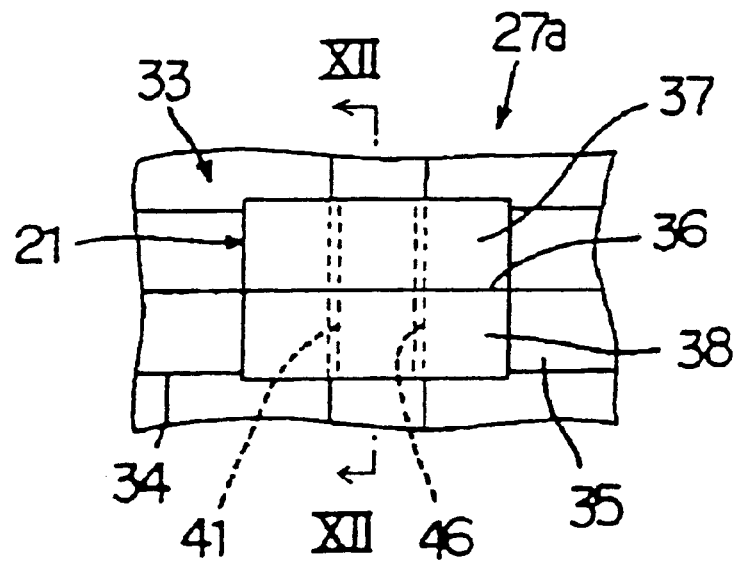
FIG. 11 is a bottom view showing the chip-like electronic part 21 being held by the holder 27a of FIG. 10.

In the case where the second holder is used as described above, it is preferable to use a holder 27a shown in FIG. 10 through FIG. 12. Holder 27a is provided with a recess portion 46 which accommodates the band of conductive paste 41 applied to the side surfaces 31, 32 and prevents the holder 27a from being brought into contact with the conductive paste 41 on these sides. This prevents the band of conductive paste 41 from being peeled off and the holder 27a from being stained by the conductive paste 41. The width of the recess portion 46 is preferably wider than that of the band of conductive paste 41. The structure of the holder 27a is otherwise substantially similar to that of the holder 27 and a further explanation will not be provided. This holder may be used with any of the foregoing paste bases, for example, that of FIG. 7.

Figure 20:
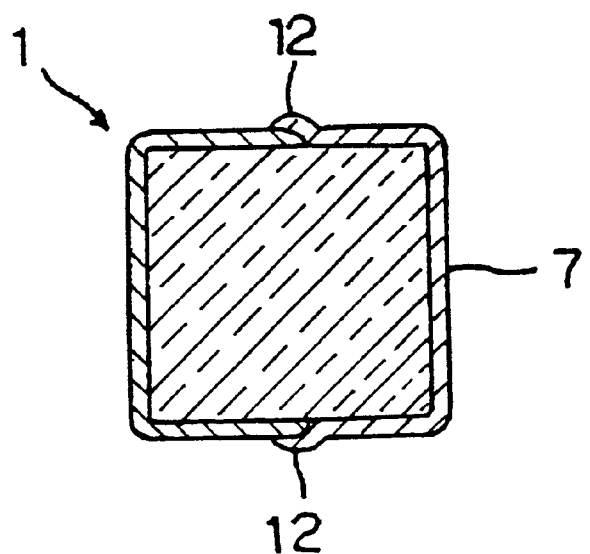
FIG. 20 is a sectional view schematically showing the conductive paste 7 extending along the entry periphery of the outer surface of the chip-like electronic part 1 using the process shown in FIG. 19.

As shown in FIGS. 11 and 12, the holder 27a holds the chip-like electronic part 21 with the uncoated side surfaces 37, 38 facing outwardly and with the band of conductive paste 41 located on side surfaces 31, 32 positioned inside of the recess portion 46. The conductive paste 41 is then applied to the exposed side surfaces 37, 38 in accordance with any of the process described above. When this process is completed, the band of conductive paste 41 will extend around the entire periphery of the chip-like electronic part as illustrated in FIG. 13 without the formation of build up (e.g. overlap) areas in the central portions of the side faces 31, 32, 37 and 38 such as are created when using the prior art processes. Compare FIGS. 13 and 20. By curing the conductive pastes 41a and 41b, the desired central electrode 24 as shown by FIG. 1 is formed.

To form the end electrodes 22 and 23 at respective end portions of the chip-like electronic part 21, the end portion of the chip-like electronic part 21 may be dipped into a tank of conductive paste and thereafter, the conductive paste is cured. It is preferable that the curing operation be carried out simultaneously with the curing operation for forming the central electrode 24 mentioned above.

Figure 14:
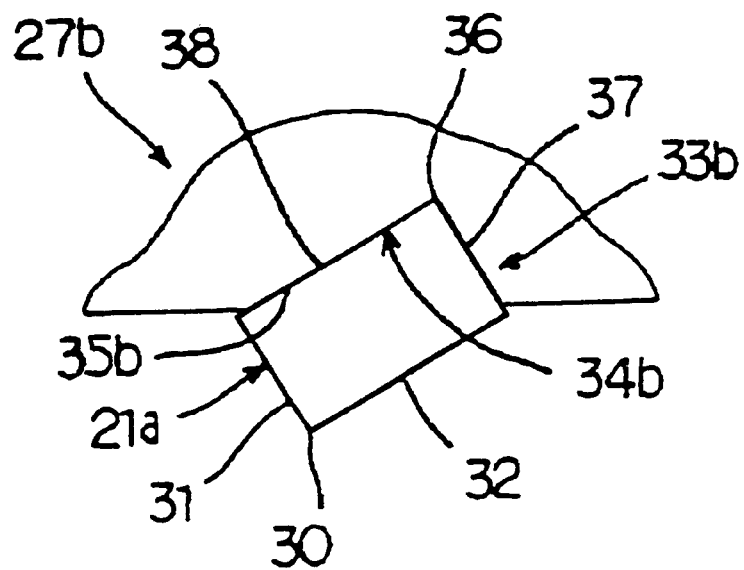
FIG. 14 is a view corresponding to FIG. 6 showing the chip-like electronic part 21a of FIG. 4 being held by a holder 27b.

When forming the central electrode 24 on a chip-like electronic part 21b having a rectangular cross section, a holder 27b (FIG. 14) is used. This holder has a holding groove 34b whose shape corresponds to that of the chip-like electronic part 21b. More particularly, the holding groove 34b has the shaped right triangle dividing the cross sectional profile of the chip-like electronic part 21a diagonally. The structure and operation of holder 27b is otherwise the same as holder 27 and no further description will be provided.

In the foregoing embodiments, the end electrodes 22, 23 are preferably formed by dipping. However, they can also be formed by, for example, using a process similar to that used to form central electrode 24 as shown in FIGS. 15 and 16.

Figure 15:
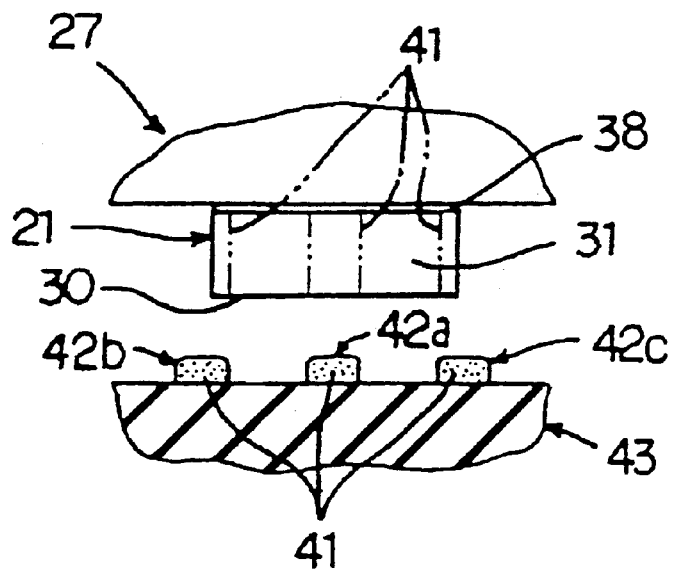
FIG. 15 is a view corresponding to FIG. 8 for explaining another embodiment of the present invention.
Figure 16A:
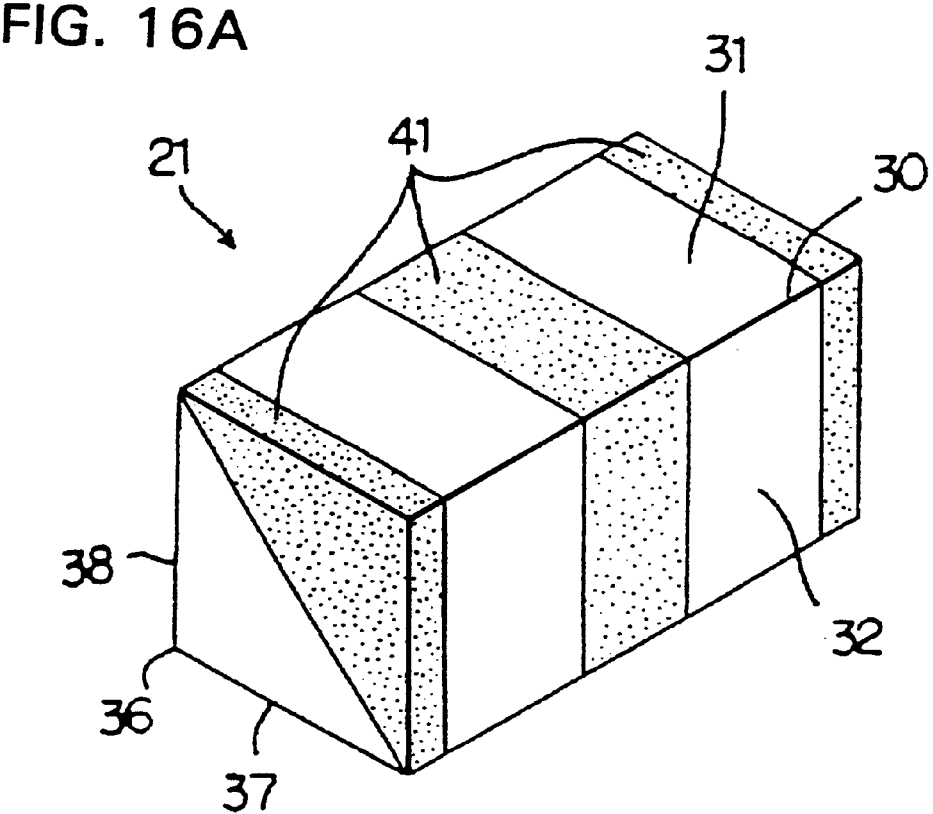
FIG. 16A is a perspective view showing the chip-like electronic part 21 after the conductive paste 41 has been applied to one-half of the electronic part after having been processed by the step shown in FIG. 15.

As shown in FIG. 15, three conductive paste streaks 42a, 42b and 42c are formed on an elastic paste base 43 at areas corresponding to the central portion and end portions of the chip-like electronic part 21. In the embodiment shown, the conductive paste streaks 42a, 42b and 42c, are placed on a flat surface of the paste base 43. Other processes such as that of FIGS. 7 and 9 can also be used. Whichever process is used, the holder 27 and paste base 43 are moved toward one another to bring the conductive paste streaks 42a, 42b and 42c into contract with the side surfaces 31, 32 of the chip-like electronic part 21 while the paste base 43 is deformed to surround those side surfaces. As a result, as shown in FIG. 16A, band of conductive paste 41 is applied to the outer surfaces 31, 32 as well as one half of the end surfaces of the chip-like electronic part 21.

The chip-like electronic part 21 is then held in an orientation wherein the two uncoated side faces 37 and 38 are exposed and a coating of conductive paste 41 is applied to the side surfaces 37, 38 as well as the remaining end surfaces using the foregoing process to form three bands of conductive paste 41 extending around the entire periphery of the part 21 and corresponding to a central electrode 24 and two end electrodes 22 and 23.

Figure 16B:
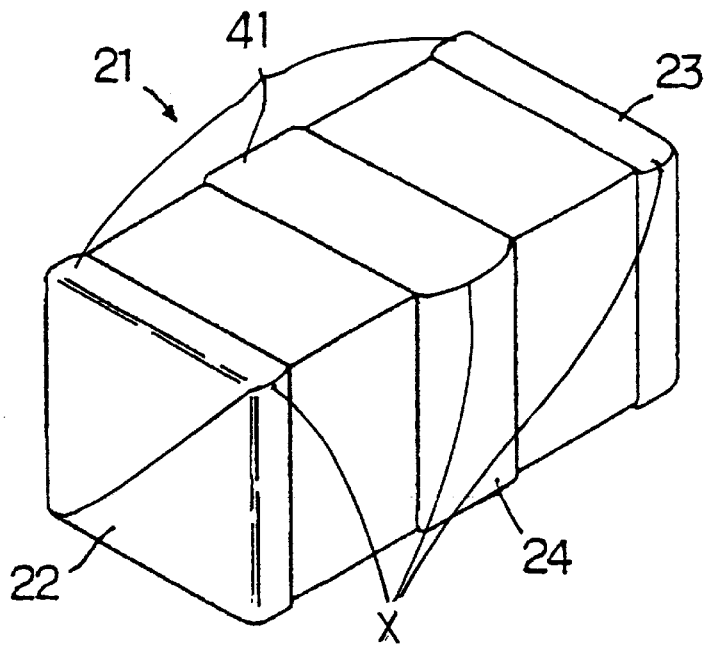
FIG. 16B is a perspective view showing the chip-like electronic part 21 after the conductive paste 41 has been applied to all of the electronic part.

As shown in FIG. 16B, the conductive paste 41 is applied to all areas where end electrodes 22 and 23 and the central electrode 24 should be formed. Overlapping portions X are formed in the end electrodes 22, 23 and the central electrode 24 as a result of the conductive paste 41 being applied as described above. Finally, the conductive paste 41 is cured, thereby forming the end electrodes 22, 23 and the central electrode 24. The overlapping portions X of the conductive paste are swollen after the conductive paste 41 as has been cured.

If desired, the foregoing process may be used to form just the end electrodes 22, 23 of the chip-like electronic part 21 in which case only the conductive paste streaks 42b and 42c (FIG. 15) are formed on the paste base.

Figure 17:
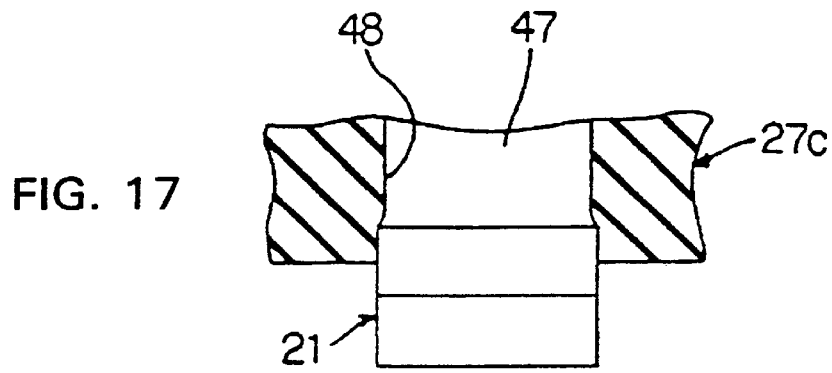
FIG. 17 is a sectional view for explaining a further embodiment of the present invention and showing the chip-like electronic part 21 being held by a holder 27c which is used in place of the holder 27 shown by FIG. 5 through FIG. 7.
Figure 18:
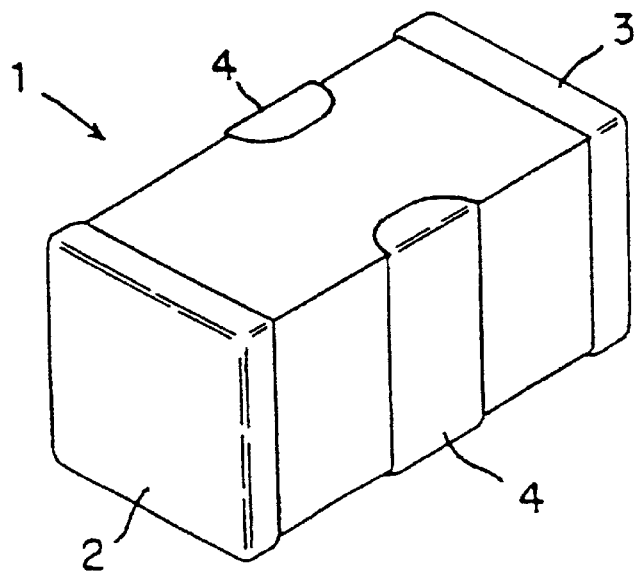
FIG. 18 is a perspective view of a conventional chip-like electronic part 1 which is of interest for the present invention.
Figure 19:
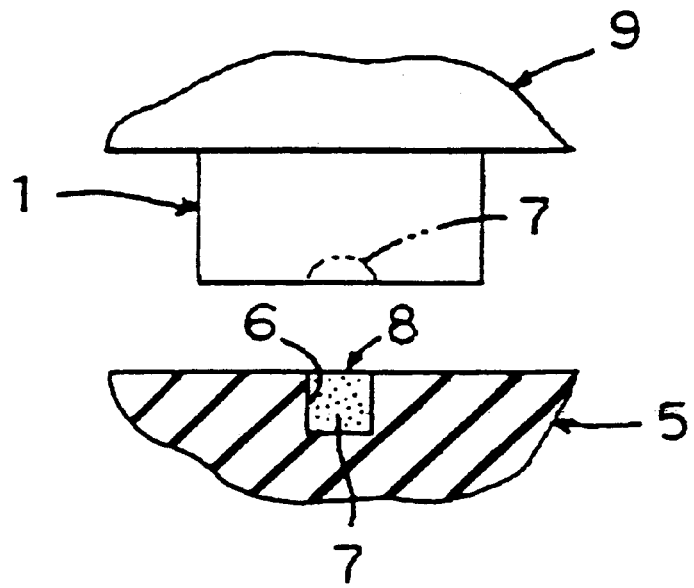
FIG. 19 is a view corresponding to FIG. 7 showing a step of providing a conductive paste 7 onto the chip-like electronic part 1 to form a central electrode 4.

In lieu of the foregoing holders which contain a holding groove, the holder 27c of FIG. 17 may be used (indeed any suitable holder may be used to carry out the process of the present invention). Holder 27c has a holding hole 47 for holding the chip-like electronic part in the required orientation. At least an inner peripheral face portion 48 of the holding hole 47 is elastic. The chip-like electronic part 21 is held in a desired orientation by elastically sandwiching opposite end faces of the chip-like electronic part 21 extending perpendicular to the hole 47.

In the foregoing embodiments, the process of the present invention is applied to a chip-like electronic part 21 or 21a in the shape of a quadrangular prism. However, the process of the present invention can be used with other chip-like electronic parts such as those having a polygonal or a cylindrical shape. In the case of the chip-like electronic part having a cylindrical shape, one of generators present on the outer surface constitutes one edge line. Additionally, the present invention is applicable to a chip-like electronic part other than the three terminal capacitor.

The present invention may be embodied in other specific forms without departing from the spirit or essential attributes thereof and, accordingly, reference should be made to the appended claims, rather than to the foregoing specification, as indicating the scope of the invention.

What is claimed is:

1. A combination, comprising:

a chip electronic part having a plurality of outer surfaces extending generally parallel to a central axis of the chip electronic part, at least one of the outer surfaces having a band of conductive material located thereon; and a holder holding the chip conductive part in an orientation wherein at least one of the outer surfaces of the chip electronic part extends outwardly from the holder and wherein the surface(s) of the chip electronic part which have the band of conductive material located thereon face inwardly of the holder and are not exposed.

2. The combination of claim 1, wherein the holder includes a recess in which the band of conductive material is located.

3. The combination of claim 1, wherein the holder has a groove, including a plurality of side walls, for holding the electronic part, a shape of the groove corresponding generally to the shape of the portion of the chip electronic part being held in the groove, at least a portion of the band of conductive material being located in the groove.

4. The combination of claim 3, wherein the walls of the chip electronic part which have the band of conductive material formed thereon are in contact with the side walls of the groove and the band of conductive material itself is situated in a recess formed in the groove such that the band of conductive material does not contact the walls of the groove or the walls of the recess.

5. The combination of claim 3, wherein the chip electronic part is formed in a shape of a quadrangular prism and the groove is formed in a V-like shape.

6. A chip electronic part comprising:

a main body portion having a central axis, a polygonal cross section as viewed in a plane which is perpendicular to the central axis, a plurality of side surfaces extending in respective planes which are generally parallel to the central axis, and a pair of end surfaces extending generally parallel to the central axis, each adjacent pair of side surfaces meeting along a respective edge of the main body portion;

a pair of end electrodes located on the end surfaces of the main body portion; and a central electrode comprising a sintered metal formed of an electrode paste and extending over each of the side surfaces of the main body portion so as to extend entirely around the outer periphery of the main body portion, the central electrode being formed of two bands of sintered conductive paste, the two bands meeting at respective edges of the main body portion.

7. The chip electronic part of claim 6, wherein the two respective edges are located 180 degrees apart from one another as measured around the central axis of the main body portion.

8. The chip electronic part of claim 7, wherein the two bands overlap one another at the respective edges.

9. The combination of claim 2, wherein the holder holds the chip electronic part in the recess without the band of conductive material touching the walls of the recess.

10. The chip electronic part of claim 6, wherein a build up area is not formed in the central portion of the side surfaces.

* * * * *